(No Model.) 2 Sheets—Sheet 1.
B. F. SPARR.
APPARATUS FOR DISINTEGRATING FIBROUS PLANTS.
No. 370,286. Patented Sept. 20, 1887.
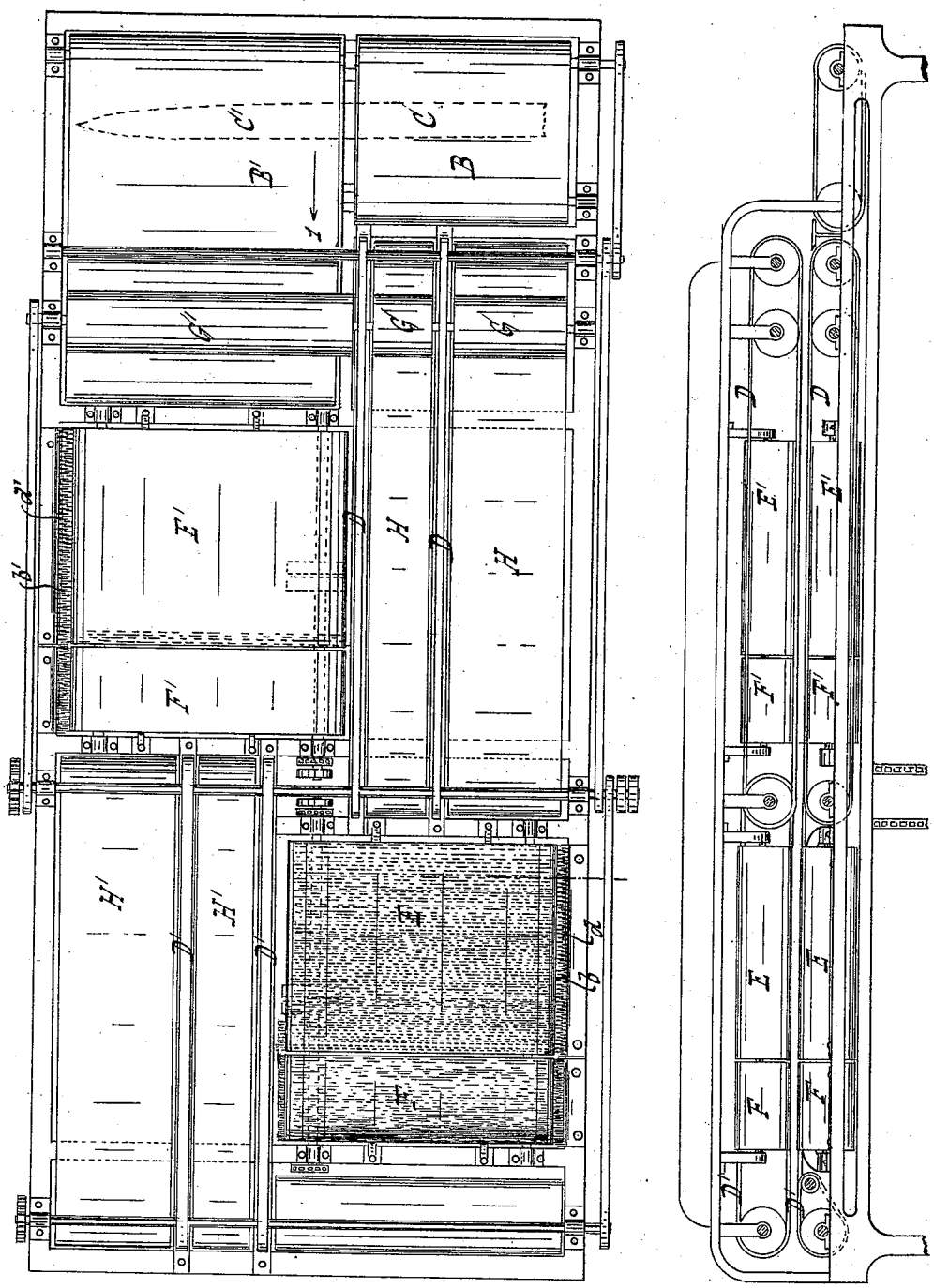

(No Model.) 2 Sheets—Sheet 2.
B. F. SPARR.
APPARATUS FOR DISINTEGRATING FIBROUS PLANTS.
No. 370,286. Patented Sept. 20, 1887.
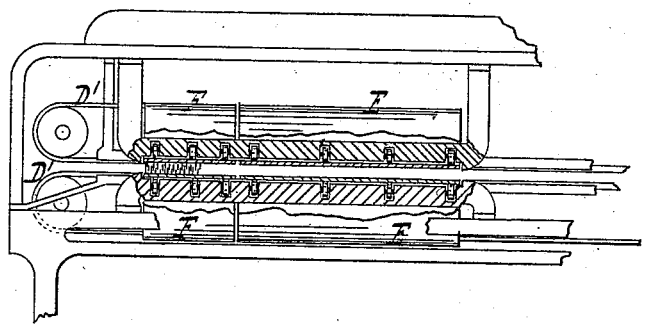
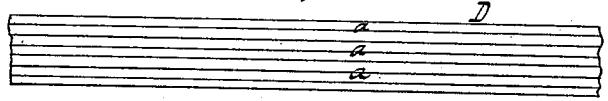
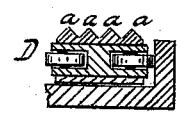
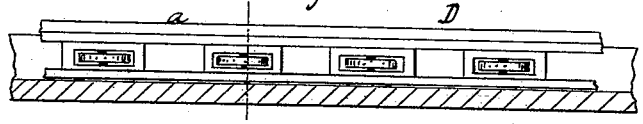
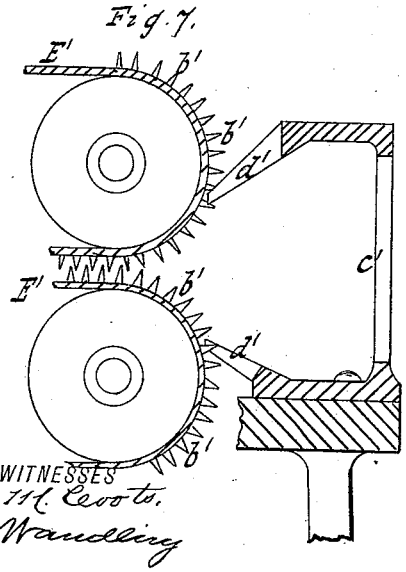
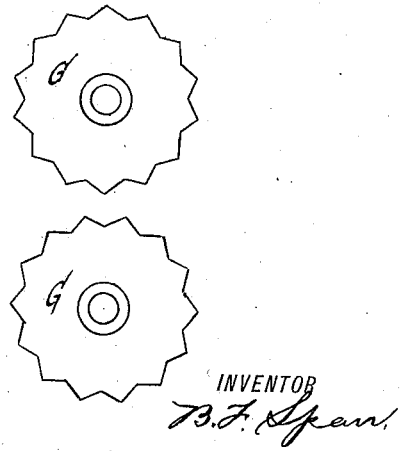

UNITED STATES PATENT OFFICE.

BENJAMIN F. SPARR, OF BROOKLYN, NEW YORK.

APPARATUS FOR DISINTEGRATING FIBROUS PLANTS.

SPECIFICATION forming part of Letters Patent No. 370,286, dated September 20, 1887.

Application filed January 3, 1885. Serial No. 151,963. (No model.)

*To all whom it may concern:*

Be it known that I, BENJAMIN F. SPARR, a citizen of the United States, residing at Brooklyn, in the county of Kings and State of New York, have invented new and useful Improvements in Apparatus for Disintegrating Fibrous Plants, of which the following is a specification.

This invention has for its object to provide novel means for disintegrating fibrous plants; and it consists in the combination of devices, hereinafter described and claimed, reference being made to the accompanying drawings, in which—

Figure 1 represents a plan or top view. Fig. 2 is a side view. Fig. 3 is a sectional side view. The remaining figures are details, which will be referred to as the description progresses.

Similar letters indicate corresponding parts.

In the drawings, the letter A designates the frame which forms the bearings for the working parts of my machine.

B B' are two endless aprons, which serve to carry the leaf or plant C C' to be disintegrated into the machine, one half of such leaf being supported by the apron B and the other half by the apron B', as indicated in Fig. 1. As the leaf is carried in by the aprons B B' in the direction of arrow I, Fig. 1, the part C thereof enters between the longitudinal gripping-belts D D, which are provided with sharp-pointed ridges $a$, extending in the direction of their length, (see Figs. 4 and 5,) so that they bite into the flesh of the leaf and retain the same firmly in position. Said gripping-belts are provided with friction-rollers, (see Figs. 5 and 6,) so that they move easily between their guides. While being carried by the gripping-belts the entire leaf is exposed to the action of the crushing-rollers G G G' G', a detached end view of which is shown in Fig. 8. The teeth of these rollers crush the flesh of the leaf, so that the same can be readily removed by the subsequent action. As the motion of the leaf proceeds, its part C' is carried between the transverse disintegrating-belts E' E', an enlarged side view of which is shown in Fig. 7. These belts are provided with teeth $b$, and by the action of these teeth the fleshy portion of the part C' of the leaf is torn off and discharged through opening $c'$ in the frame A. (See Fig. 7.) Inside of this opening are situated a series of clearing-teeth, $d'$ $d'$, which extend between the teeth $b'$ $b'$ of the disintegrating-belts E' E', and which serve to prevent said teeth $b'$ $b'$ from becoming choked. After the flesh has been removed from the part C' of the leaf by the action of the disintegrating-belts E' E', said part C' passes between the endless brush-belts F' F', which are situated close behind the belts E' E', and which serve to remove from the fibers of the part C' such small particles of flesh which may still adhere to them. As the leaf is carried forward by the moving grippers D D, the disintegrated part C' of the leaf passes between the longitudinal gripping-belts D' D', which are constructed like the gripping-belts D D, and serve to retain the part C' firmly against the pull of the transverse disintegrating-belts E E, which now begin to act upon the part C of the leaf. These disintegrating-belts E E are constructed like the belts E' E', and after by their action the flesh of the part C of the leaf has been torn off and discharged through the side of the frame A, the part C is exposed to the brush-belts F F, and after having been cleaned of the fleshy particles which may still adhere to the same, the disintegrated leaf or the clean fibers are finally discharged from the machine at the end opposite to that at which said leaf was fed in.

It must be remembered that during the time the part C of the leaf is carried by the gripping-belts D D it is supported by the aprons H H, and during the time the part C is carried by the gripping-belts D' D' it is supported by the aprons.

The feed-aprons B B', the longitudinal gripping-belts D D D' D', the transverse disintegrating-belts E E E' E', and the brush-belts F F F' F' are geared together by belts, chains, cog-wheels, or any other means suitable for the purpose, so that they move with the requisite velocity and they are driven from a common driving-shaft, and the gripping-belts, the disintegrating-belts, and the brush-belts are supported by rollers or otherwise, so that they are prevented from sagging and they are enabled to retain the leaf and to act thereon in the desired manner.

What I claim as new, and desire to secure by Letters Patent, is—

1. The combination, substantially as hereinbefore described, with the feed-aprons B B', of the longitudinal gripping-belts D, the transverse disintegrating-belts E', the longitudinal gripping-belts D', and the transverse disintegrating-belts E.

2. The combination, substantially as hereinbefore described, with the feed-aprons B B', of the longitudinal gripping-belts D, the transverse disintegrating-belts E', the longitudinal gripping-belts D', the transverse disintegrating-belts E, and the brush-belts F F'.

3. The combination, substantially as hereinbefore described, with the feed-aprons B B', of the longitudinal gripping-belts D, the transverse disintegrating-belts E', the longitudinal gripping-belts D', the transverse disintegrating-belts E, and the cleansing-teeth $d$ $d'$.

4. The combination, substantially as hereinbefore described, with the feed-aprons B B', of the crushing-rollers G G', the longitudinal gripping-belts D, the transverse disintegrating-belts E', the longitudinal gripping-belts D', and the transverse disintegrating-belts E.

In testimony whereof I have hereunto set my hand and seal in the presence of two subscribing witnesses.

BENJAMIN F. SPARR. [L. S.]

Witnesses:
W. M. COOTS,
M. F. SPARR.